Sept. 22, 1942.   W. E. STEEN   2,296,542
SPINDLE PACKING FOR METERS AND THE LIKE
Filed Aug. 1, 1940   2 Sheets—Sheet 1

Inventor:
William E. Steen.

Attorneys.

Sept. 22, 1942.                 W. E. STEEN                    2,296,542
                  SPINDLE PACKING FOR METERS AND THE LIKE
                  Filed Aug. 1, 1940              2 Sheets-Sheet 2

Inventor.
William E. Steen.

Attorneys.

Patented Sept. 22, 1942

2,296,542

UNITED STATES PATENT OFFICE 2,296,542

SPINDLE PACKING FOR METERS AND THE LIKE

William E. Steen, Pasadena, Calif., assignor to Smith Meter Company, Los Angeles, Calif., a corporation of California Application August 1, 1940, Serial No. 349,367

2 Claims. (Cl. 286—9)

This invention relates to packings for drive spindles, and is more particularly concerned with the packing of spindles which extend through a wall or walls defining chambers containing fluid under relatively high pressure.

While the invention is in no way limited thereto, it is useful with particular advantage in connection with meters for measuring the flow of highly volatile fluids, such as gasoline.

Though not limited thereto, the invention is particularly well adapted for use in connection with meters comprising a double-walled housing, with the measuring chamber and rotor mechanism, proper, contained within the inner wall, means being provided for operatively connecting the rotor mechanism to the recording or registering mechanism mounted on the outside of the outer housing. By this expedient, a standard meter adapted to withstand usual pressures, may be mounted bodily within the bore of an outer, heavy casing, the housing of the standard meter providing the inner wall of the double-walled structure.

The measuring chamber and flow channel are provided within the inner housing (that is, the housing of the standard meter) but the inlet to the flow chamber opens to the space between housing walls. The outlet from the flow channel opens directly to the main outlet of the outer casing.

Since high pressure fluid will occupy the space between housings, it is essential to provide a special type of seal for rendering fluid tight the drive connection between the standard meter within the outer housing and the registering mechanism at the exterior of said housing, and it is one of the objects of the invention to provide a particularly effective mechanism for accomplishing this.

Other objects and features of novelty will be made apparent in the following detailed description, reference being had to the accompanying drawings, in which Fig. 1 is a transverse, horizontal section through a device embodying the invention;

Figure 1:
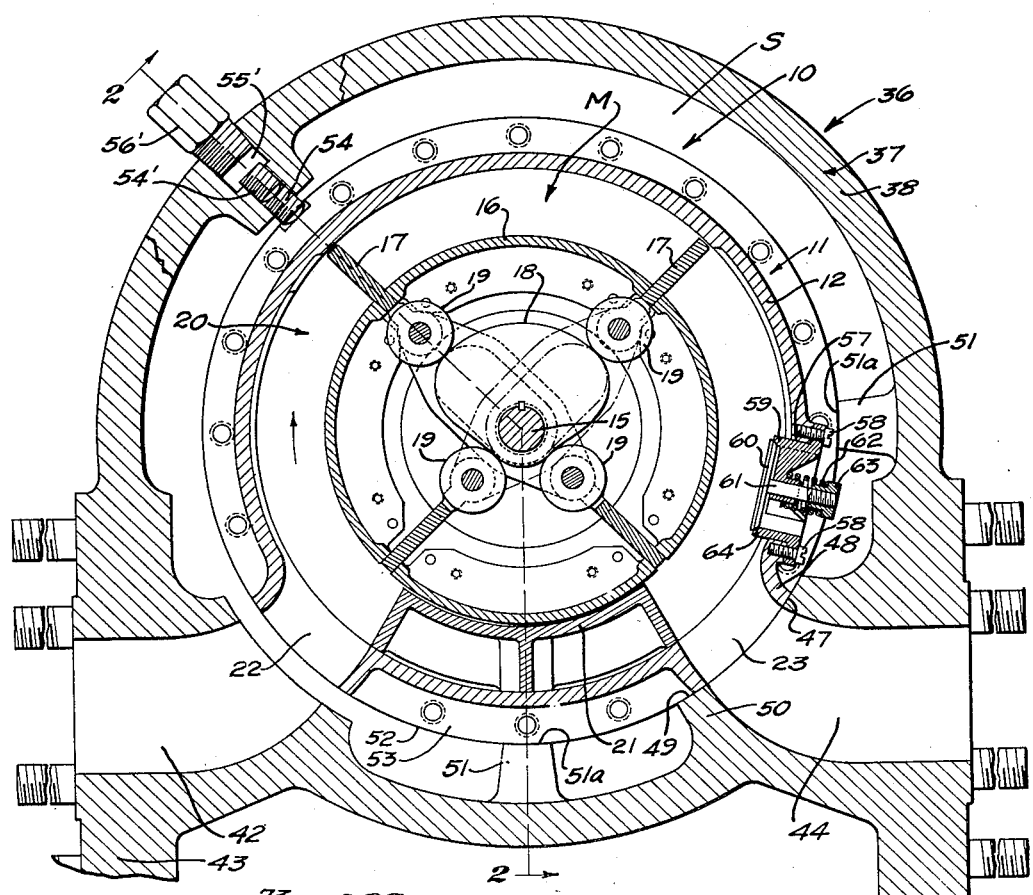

Though this is not controlling on the invention the meter mechanism generally indicated at 10 is illustrated as being similar, in principle, to certain of the meters shown in Patent No. 2,207,182, dated July 9, 1940, and entitled Fluid flow mechanism. This mechanism is made up of a housing indicated at 11 consisting of a cylindrical barrel 12, bottom plate 13 and top plate 14. A coaxial shaft 15 is supported in housing 11 and carries, for rotation, a rotor 16 which, in turn, supports blades 17. A stationary cam 18 coacts with blade rollers 19 to cause the blades to shuttle transversely of flow channel 20 due to rotor-rotation as set up by flow of fluid in a clockwise direction as viewed in Fig. 1.

An arcuate abutment 21 secured to barrel 12 and projecting across channel 20, separates the inlet and outlet 22 and 23, respectively, of that flow channel, the blades and cam being so constructed that each blade is radially retracted as it passes the abutment, all as will be readily understood.

The measuring chamber of the meter is that portion M of the flow channel which extends between two fully projected blades when they are in the position of Fig. 1, it being understood that any registering mechanism taking its power from rotor 16 is, in effect a rotor revolution counter, the registering mechanism being calibrated in any desired volumetric unit and in consonance with the volume of fluid represented by the amount passed through the measuring chamber per revolution of the rotor.

The drive connection between the rotor and the registering mechanism indicated at R, so far as it is carried by the structure thus far described, embodies a pinion 24 on rotor 16 meshing with a gear 25 on shaft 26, the latter extending vertically through the packing 27 in head 14. The upper end of shaft 26 carries a change-gear 28 meshing with gear 29 supported for rotation on stud shaft 30, the latter being carried in axial alinement with shaft 15 by cap 31. In the illustrated embodiment, though this is not limitative on the invention, shaft 15 is stationarily held to housing 11.

Gear 29 carries one-half of a loose clutch generally indicated at 33. It comprises a hub 34 carrying diametrically opposite clutch pins 35.

The outer casing of the meter is indicated generally at 36 and consists of a bowl 37 having a cylindric wall-portion 38 and a bottom portion 39. A removable head is indicated at 40, attachment studs and bolts being shown at 41. An inlet opening 42 through bowl-boss 43 opens to the interior of the bowl, being in angular registration with but spaced radially from inlet 22. The outlet opening 44 of the bowl is in direct communication with outlet 23.

With head 40 removed, the entire meter-mechanism 10 may be lowered to place within bowl 37, in which position the meter-mechanism and bowl are substantially concentric. The lower head 13 of housing 11, carries vertical posts 45 which rest on lugs 46 rising from base 39. The end 47 of inner casing boss 48 is arcuately machined to snugly fit the arcuate face 49 of boss 50, the latter being provided internally of the bowl and about outlet 44. Radial positioning lugs 51 on bowl 37 are arranged adjacent but at opposite sides of boss 50, their inner faces 51a being accurately machined to engage the turned, peripheral faces 52 of flanges 53.

Radial thrust screws 54 are threaded through wall 38 of the bowl at a point approximately diametrically opposite boss 50, serving to snugly position housing 11 against boss 50 and lugs 51 so the previously mentioned finished faces of the members are in tight arcuate engagement, thus insuring a normal flow from outlet 23 through outlet 44 and holding housing 11 against horizontal shift within the bowl. Screws 54 also extend into directly overlying relation with shoulders 55 at the bottom of slots 56 provided in flanges 53, thus serving to hold housing 11 down with legs 45 in snug engagement with bosses 46, though the clamping effect of the screws in a radial direction also aid as hold-down means.

Lock screws 54' may be threaded in behind screws 54, and the enlarged bores 55' through which access may be had to the screws, are closed by threaded plugs 56'. A drain plug 57' may be provided in the base 39.

It will be seen that fluid entering inlet 42 will fill the space S between housing 11 and housing 36 but its only free passage of flow will be through inlet 22, flow passage 20 and outlets 23, 44, the flow through this course acting on blades 17 to rotate the rotor and thus, through the drive connection previously specified, driving gear 29 and clutch member 33. An opening 57 is made through barrel 12 of housing 11 adjacent port 23. Arranged in this opening and bolted at 58 to barrel 12 is a valve cage 59 carrying a valve head 60 on stem 61. A spring 62 acts between the cage and stem head 63 in a manner constantly tending to hold head or stopper 60 on the cage seat 64.

Under normal conditions, stopper 60 will remain closed and fluid in passage 20 will merely pass by the valve and out through outlets 23—44. However, should the rotor jam or be unduly retarded, the pressure within space S will be built up over and above the pressure of the fluid between abutment 21 and the next adjacent projected blade to the right thereof, and the preponderant pressure in space S will thus open valve 60 and the fluid from that space may thus pass through outlets 23—44. The passage of the fluid through this course is, in effect, a by-passage around the rotor and thus permits the rotor to be stalled without danger of damaging or wrecking it, as would otherwise be the case.

On top of head 40 is bolted a housing or cap 70 which, in turn, carries externally the registering mechanism R, the lower end of the register actuating shaft being indicated at 71 and carrying cross pins 72 making up one-half of the loose clutch indicated at 73. The drive of clutch 73 from clutch member 33 must, of course, pass through head 40, and since the space S' between heads 14 and 40 is in communication with space S with the result that fluid fills that space S', provision must be made for preventing the leakage of fluid around the drive connection as it passes through head 40.

Figure 3:
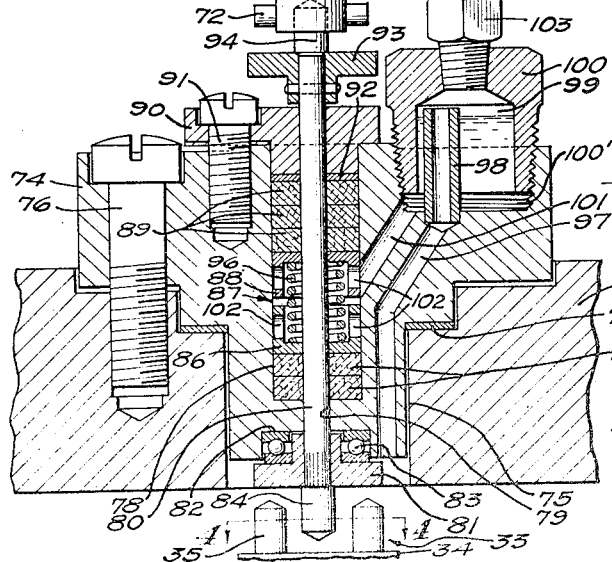
Fig. 3 is an enlarged fragmentary, vertical section of a drive shaft sealing device shown in elevation in Fig. 2, and being in the same aspect as shown in Fig. 2.
Figure 2:
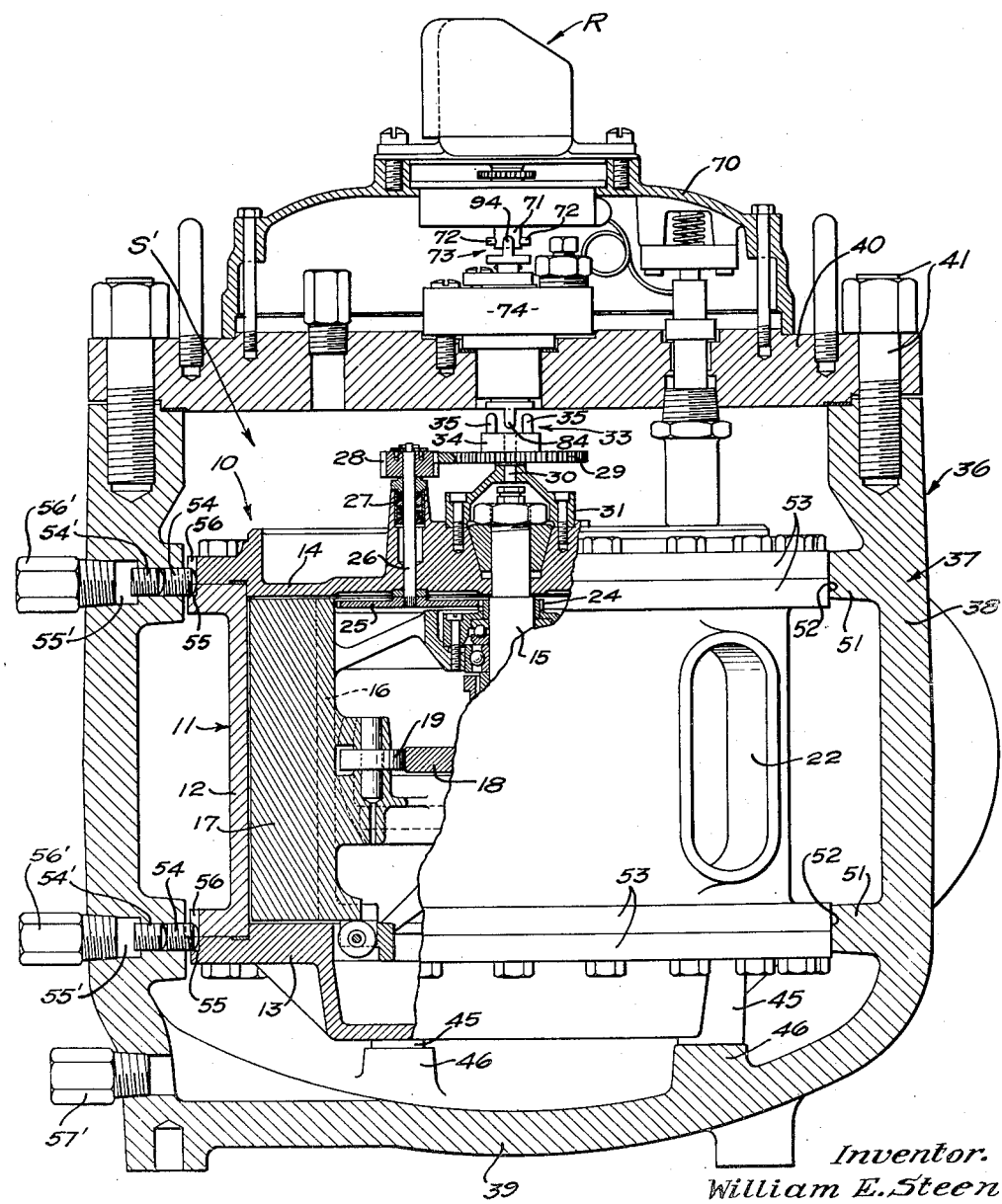
Fig. 2 is a section on line 2—2 of Fig. 1, showing certain of the parts in elevation.
Figure 4:
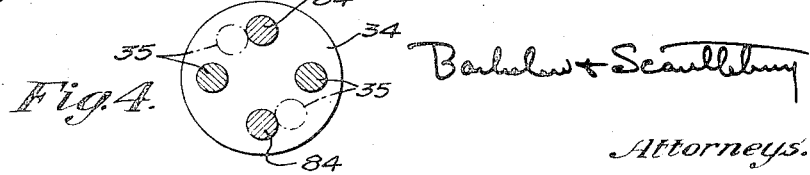
Fig. 4 is a section on line 4—4 of Fig. 3.

This means is shown in detail in Fig. 3. A cylindrical container or body member 74 extends through a stepped cylindrical bore 75 in head 40, being held to that head by screw 76 and being packed off therefrom by gasket 77. Container 74 has a bore 78 opening to the top thereof, and a communicating reduced diameter bore 79, the two bores being coaxial with gear 29 and disk 34. A coaxial spindle 80 extends through the bores, having running fit in bore 79, and has a head 81 between which and shoulder 82 is a thrust bearing 83, which takes the thrust imposed on the spindle by the fluid under pressure in space S'. Head 81 is the upper half of loose-clutch 33, being provided with pins 84 (Figs. 3 and 4) which are adapted to be engaged by pins 35 when gear 29 is rotated, though there is sufficient capacity for play between pins to give proper loose-clutch characteristics and provide for any misalinement of clutch members.

In the bottom of bore 78 are provided compressible composition packing rings 85 upon which rests one-half 86 of a longitudinally extensible packing piston 87, the other half 88 of this piston supporting compressible composition packing rings 89. Between follower 90, bolted to container 74 at 91, and the upper packing ring 89, is interposed a gasket 92. Pinned to the upper end of the spindle is a head 93 carrying pins 94 which head and pins make up the other half of loose-clutch 73. Pins 94 cooperate with pins 72 in the manner described in connection with pins 35 and 84.

The members 86 and 88 of extensible piston 87 are in the form of cups arranged flange to flange, a spring 96 being interposed between the cups and tending constantly to spread them and thus impose longitudinal compressive force on rings 85 and 89 to hold them in fluid tight peripheral engagement with both spindle 80 and the defining wall of bore 78.

It will be seen that spring 96 thus acts to keep the spindle packing relatively tight, but where the pressure of fluid within space S' becomes of relatively increased magnitude, it is desired that the packing effect on the spindle be likewise increased. For this purpose, we provide a duct 97 leading from that space and through a standpipe 98 into chamber 99 formed in the plug 100, said plug being threaded into bore 100' of container 74. Said bore opens to the bottom of chamber 99 and a duct 101 leads from the bottom of bore 100' to bore 78 at a point adjacent the means position of piston 87. Piston cups 87 have side ports 102 one of which, or the space between cups, is always in communication with the lower end of duct 101.

A filling plug 103 provides for the deposition of actuating fluid, preferably of a nature not readily miscible with the fluid being metered and also preferably having superior lubricating and fluid-sealing qualities within chamber 99. For instance, glycerin may be used as the actuating fluid. The actuating fluid fills duct 101 and the cavity within extensible piston 87 and will extend to a height a little below the upper end of standpipe 98.

It will be seen that the fluid within chamber S' will impose its pressure on the upper face of the actuating fluid within chamber 99 and thus force that actuating fluid between cups 86, 88 to spread them apart in a manner similar to the described action of spring 96. At the same time the glycerin will lubricate the spindle and will, itself, and as a relatively heavy fluid, aid in the seal against leakage of the thinner and lighter fluid being metered. Thus, tightness of the packing about the spindle will be in proportion to the pressure of the fluid being metered—the higher the pressure, the tighter the packing. And yet, with increased packing-tightness, there is increased pressure of the lubricating fluid.

While I have shown and described a preferred embodiment of my invention, various changes in design, structure and arrangement may be made without departing from the spirit and scope of the appended claims.

I claim:

1. In a device for packing off a spindle which extends through and has bearing within a wall defining one side of a space containing fluid under pressure, a pair of compressible packing rings at longitudinally spaced points along the spindle and within a wall-bore through which the spindle extends, stops on the wall at the outer ends of the rings, a longitudinally extensible piston within the bore and engaging the inner ends of the rings, said piston including a pair of heads capable of relative axial movement, each of said heads having a skirt having sliding fit with the bore wall, the skirts of the two heads being in end-to-end opposition, there being a duct in the wall opening to said bore, each of the piston skirts having a plurality of holes adapted selectively to register with the duct upon rotation or relative axial movement of the heads, and means whereby actuating fluid may be introduced to said duct with varying pressure depending upon the pressure of the fluid in said space.

2. In a device for packing off a spindle which extends through and has bearing within a wall defining one side of a space containing fluid under pressure, a pair of compressible packing rings at longitudinally spaced points along the spindle and within a wall-bore through which the spindle extends, stops on the wall at the outer ends of the rings, a longitudinally extensible piston within the bore and engaging the inner ends of the rings, said piston including a pair of heads capable of relative axial movement, each of said heads having a skirt having sliding fit with the bore wall, the skirts of the two heads being in end-to-end opposition, there being a duct in the wall opening to said bore, each of the piston skirts having a plurality of holes adapted selectively to register with the duct upon rotation or relative axial movement of the heads, means whereby actuating fluid may be introduced to said duct with varying pressure depending upon the pressure of the fluid in said space, and an expansion spring about the spindle and engaging the inner ends of the heads, the engaged ends of the spring being confined within the annuli defined by the spindle and the skirts of the heads.

WILLIAM E. STEEN.